Dec. 31, 1957 C. B. FRANCIS 2,818,328
PRODUCTION OF POWDERED IRON
Filed July 28, 1954 2 Sheets-Sheet 1

INVENTOR.
Charles B. Francis
BY
Christy, Parmelee and Strickland
his attorneys

Dec. 31, 1957  C. B. FRANCIS  2,818,328
PRODUCTION OF POWDERED IRON
Filed July 28, 1954  2 Sheets-Sheet 2

INVENTOR.
Charles B. Francis
BY
Christy, Parmelee and Strickland
his attorneys

United States Patent Office 2,818,328
Patented Dec. 31, 1957

2,818,328

PRODUCTION OF POWDERED IRON

Charles B. Francis, Pittsburgh, Pa.

Application July 28, 1954, Serial No. 446,278

5 Claims. (Cl. 75—.5)

My invention relates to the production of powdered iron, and consists in certain new and useful improvements both in apparatus and in method of producing such metal.

Powdered iron metallurgy has developed rapidly in recent years and continues to grow in importance to industry; and the limits to the use of the metal in powdered form are not in sight. For certain uses the powdered iron must be very finely divided, such that it will all pass a number 200 sieve or screen, and in some cases the purity is required to exceed ninety-nine and one-half percent.

The object of my invention is to provide improvements both in method of and in apparatus for producing powdered iron of given metallurgical and physical properties at lower cost than hitherto. My invention stems also from other important objects, which will be discerned in the ensuing specification.

In accordance with the invention, I produce a salt of iron. More particularly, I subject iron or steel (say, iron or steel scrap) to the action of an acid, preferably if not essentially sulphuric or hydrochloric acid, and I produce a relatively pure ferrous sulphate or ferrous chloride in the form of a crystalline salt that holds in combination various proportions of water of crystallization. Next, I heat the salt to a temperature above 400° F. to dry it and/or to drive off the water of crystallization. Then, I heat the salt gradually preferably in the presence of hydrogen, which reduces it, beginning at 900° F., and ending at 1500° F. in the case of ferrous sulphate, or ending at 1240° F. in the case of ferrous chloride, and thereby I form a finely divided iron powder, and certain gaseous products, which are recovered and transformed into certain valuable by-products, as will appear in the following specification.

In the accompanying drawings, I illustrate an exemplary apparatus, in which and in the operation of which my invention is realized:

Fig. 7 is a view in vertical section of a tank for treating steel scrap with sulphuric or hydrochloric acid in such manner that the hydrogen liberated is recovered for use in the process of the invention.

Figure 1:
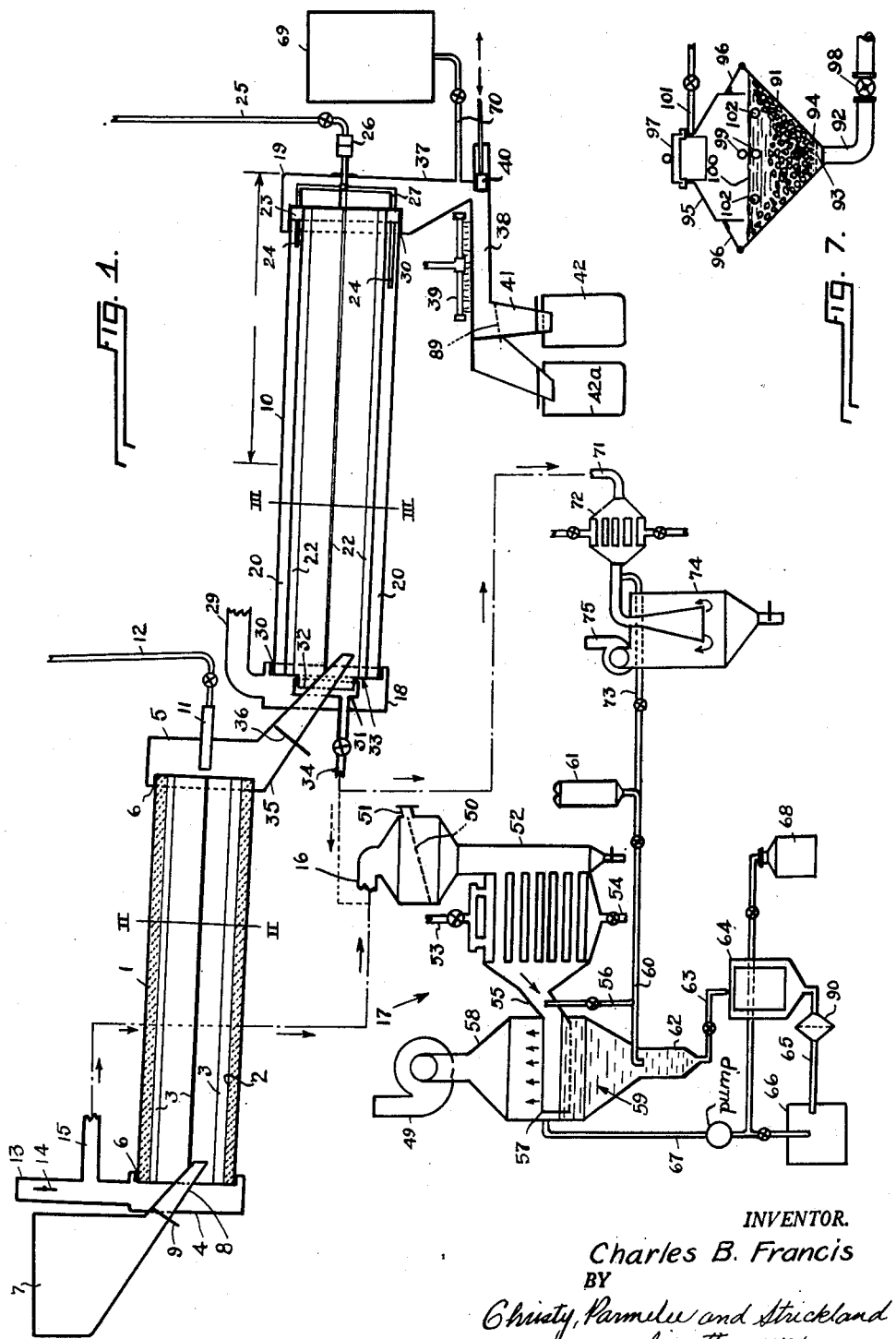
Fig. 1 is a diagrammatic view of two rotary kilns arranged in tandem, together with apparatus for processing the gases and vapors delivered by the kilns in operation.

Referring to the drawings, a kiln or retort 1 (schematically shown) is formed of a cylindrical shell of structural steel and plate, lined with a suitable refractory material 2, which serves to insulate the steel shell from the heat of the kiln in service. This kiln is mounted in an inclined position, as shown, for rotation on its longitudinal axis. The support and the driving mechanism for the rotating kiln are conventional, wherefore illustration thereof is needless. Metal blades 3 extend radially inward from the refractory lining of the kiln, and at each end of the kiln, stationary headers 4 and 5 of fabricated steel are provided, it being noted that the ends of the rotating kiln engage the stationary headers in snug joints.

The material to be treated in kiln 1 is charged into a hopper 7, whence it is delivered into the upper or inlet end of the kiln by way of a chute 8 controlled by a gate-valve 9. The kiln is fired with open flames by means of a burner 11, directed through the header 5 at the lower or discharge end of the kiln, and fluid fuel is delivered to the burner via a pipe 12, leading from a source of fuel supply, while the air for the combustion of the fuel may be inspirated by the burner from the outer atmosphere. The gaseous products of combustion and the vapors developed in the kiln find escape through a stack 13 that has a butterfly damper 14 adapted to be closed at certain and appropriate times, to divert the gases and vapors through a by-pass duct 15 to the inlet 16 of an apparatus 17.

Figure 2:
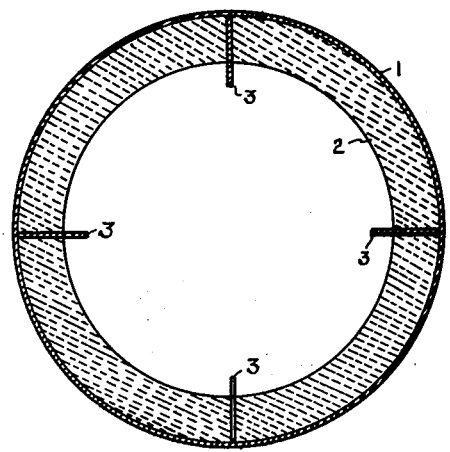
Fig. 2 is a view in cross section and to larger scale of one of the kilns, as seen in the plane II—II of Fig. 1.
Figure 3:
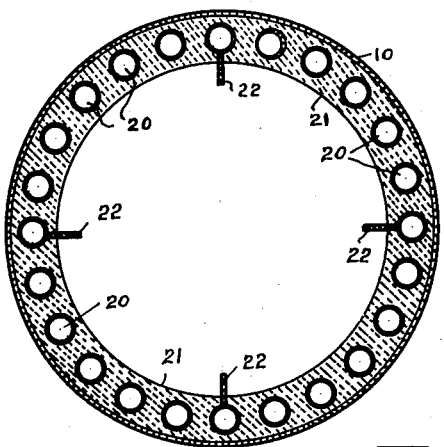
Fig. 3 is a view in cross section of the other kiln, as seen on the plane III—III of Fig. 1.
Figure 4:
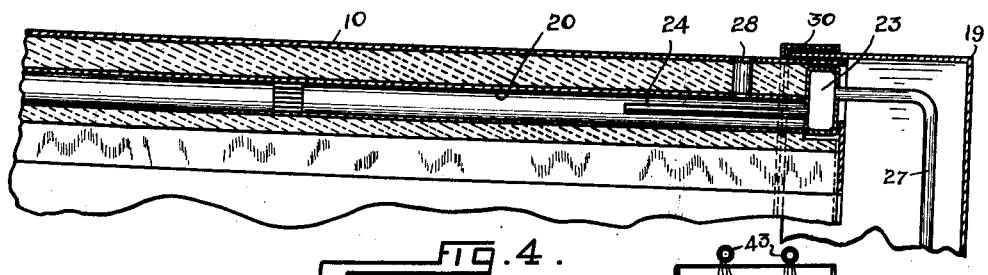
Fig. 4 is a fragmentary view to still larger scale than Figs. 2 and 3, showing in longitudinal section the structure of the second kiln at its right-hand end, Fig. 1.

A retort or kiln 10 is mounted in inclined position for rotation, as in the case of kiln 1, and its ends are enclosed by stationary headers 18 and 19 having snug overlapped engagement, as at 30, with the side wall of the kiln. As distinguished from the first kiln, however, the kiln 10 is indirectly heated, as by means of fire tubes 20 (see Figs. 1 and 2) embedded in the refractory lining 21 of the kiln. Blades 22 extend inwardly from the lining 21. As shown in Figs. 1 and 4, the right-hand ends of the fire tubes 20 are closed by an annular manifold 23, and from such manifold burner pipes 24 extend into the tubes 20 severally for various distances, whereby in service the desired temperature distribution longitudinally as well as circumferentially of the kiln may be obtained. The fuel for the burner pipes 24 is delivered from a supply line 25, Fig. 1, through a rotary coupling 26 and a tubular spider 27 to the fuel-distributing manifold 23. Due to the rotary coupling 26, the spider is free to rotate with the manifold and kiln. The air for combustion is drawn from the outer atmosphere into each fire tube through an inlet orifice 28, Fig. 4, and the products of combustion are delivered into the header 18, Fig. 1, whence they escape through an outlet duct 29.

Within the header 18 is an inner header 31, engaged to the flanged opening 32 in a steel diaphragm or end wall 33 of the kiln. The fire tubes open through this diaphragm into the outer header 18, from which the outlet duct 29 extends, while the interior of the kiln communicates through opening 32 with the inner header 31, whence the gases and vapors from within the kiln are led away by a pipe 34. The material treated in kiln 1 is discharged into a chute 35 leading from the bottom of header 5 through the headers 18 and 31, and, subject to the control of a gate-valve 36, such material is delivered into the upper or inlet end of kiln 10. From the latter kiln the solid processed material is discharged into a hopper 37 opening at the bottom of header 19, and from such hopper the said material or product drops into a cooling receptacle or chamber 38. The cooling of the chamber 38 and the product is effected by an external water spray 39. From the cooling chamber the product is discharged, as by a mechanical pusher 40 upon a vibrating screen 89. The finest powder, say 300 mesh size, drops through a funnel 41 into shipping container or receptacle 42, while the larger particles of the iron powder pass from the screen into a receptacle 42a.

In proceeding in accordance with the invention steel or iron scrap, preferable in the form of borings or turnings, is held in a bath of sulphuric acid until the bath is neutralized. Since hydrogen is liberated in the reaction, and since hydrogen is used in the reduction of the salt formed, the tank shown in Fig. 7 is a particularly effective unit in which to conduct the reaction and recover the hydrogen. This tank 91 has the form of a rectangular 45° hopper, constructed of steel plate and lined with rubber. An outlet 92 is provided at the bottom of the tank, and the mouth of this outlet is bridged with steel bars 93 which support a glass wool filter 94 to collect and retain insoluble matter. The top 95 of the tank is made of light steel plate unlined, and is equipped with two side doors 96 and a sealed cover 97, through which the scrap may be charged. To start operations, the hopper 91 is filled with scrap, as shown. Then, with a valve 98 in outlet pipe 92 closed one part by weight of concentrated sulfuric acid (sp. gravity 1.84) and three parts of water (roughly 1.6 by volume) are simultaneously admitted through tube 99 until the vessel is filled to the liquid level 100, when the following exothermic reaction occurs:

(Reaction I)

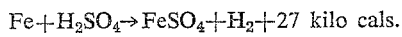
$$Fe + H_2SO_4 \rightarrow FeSO_4 + H_2 + 27 \text{ kilo cals.}$$

Figure 5:
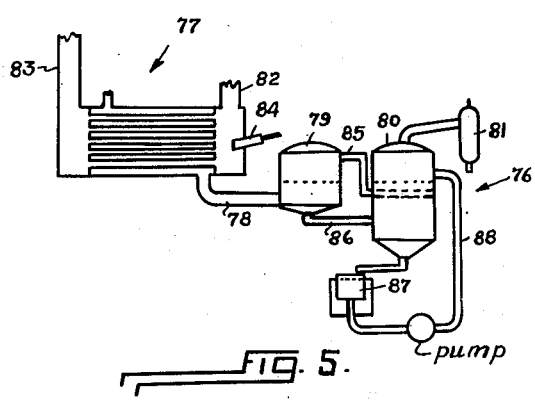
Fig. 5 is a diagrammatic view of a conventional multiple-effect evaporator which may be employed in an elaboration of the process of the invention.
Figure 6:
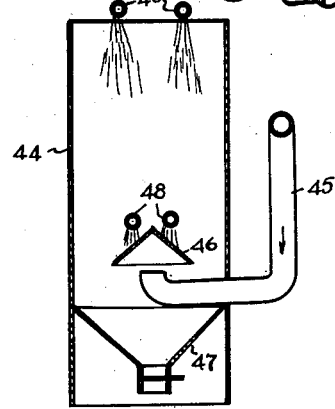
Fig. 6 is a diagrammatic view in vertical section of a spray drier which may be used in the practice of the invention.

This heat with that liberated when the acid is mixed with water is sufficient to raise the temperature of the contents of the tank to about 200° F. The hydrogen formed is led off through tube 101 to a drier (not shown) and a neutral saturated solution of ferrous sulfate is pumped through tubes 102 to an evaporator 76 shown in Fig. 5 or a spray drier 44 shown in Fig. 6. Thereafter scrap, acid and water are added as needed. The ferrous sulfate solution contains small quantities of manganese sulphate, and traces of other impurities, but is free of ferric sulfate formed in open tanks.

In the preferred practice of my invention the solution of ferrous sulfate is sprayed from nozzles 43 into the top of the drier 44. The hot-products of combustion from kiln 10 are delivered into the drier by an insulated pipe 45 connected to the outlet duct 29 of said kiln. The pipe 45 directs the hot products of combustion beneath a conical steel hood 46 above the hoppered bottom 47 of the drier, and, if required, the heat of such products of combustion is supplemented by the combustion of fuel delivered by downwardly directed burners 48. The hot products of combustion rising through the drier evaporate the water from the solution sprayed into said drier, and substantially dry crystalline ferrous sulphate (with the small quantities of impurities) are collected in the hopper at the bottom of the drier.

This crystalline material is removed from the drier and loaded into the feed hopper 7 of the kiln 1, such kiln being heated to a temperature between 800 to 900° F. With the kiln rotating at from two to three R. P. M., the gate 9 is opened and the iron salt is progressively delivered into the kiln.

Normally, the kiln 1 is filled to a depth of about one-fifth of its internal diameter, but this depth may be modified as desired. As the kiln rotates, the ferrous salt is kept thoroughly mixed by the action of blades 3, which blades serve not only to reinforce the steel shell of the kiln, to which they are welded, but they also carry the mixture upward on the rising side of the rotating cylindrical kiln body and then drop the salt into the hot gases streaming through the kiln chamber. By reason of the inclination of the rotating kiln, the tumbling salt advances in left-to-right direction through the kiln. Under the influence of the heat in the kiln the water of crystallization is driven off the salt, leaving loose or particulate anhydrous ferrous sulfate, $FeSO_4$. The products of combustion and water vapor are vented to the open atmosphere through stack 13.

The particulate solid material leaving kiln 1 flows through chute 35, controlled by gate 36, into kiln 10. The material, consisting of $FeSO_4$ contaminated with about .015% of manganese sulphate and less than 0.01% of other impurities, is preheated in kiln 1 to a temperature close to 1000° F. as it enters kiln 10. The loose material travels or advances substantially continuously through the kiln 10 slowly, since the slope of the kiln is only one-half inch per foot and it revolves at the rate of only two and one-half R. P. M. The temperature throughout this kiln is maintained at a point between 1000° F. and 1500° F., by means of the gas-fired radiant tubes 20 imbedded in the lining 21 of the kiln. As already mentioned, the varied lengths of the burners 24 in the tubes insure a uniform distribution of heat, whereby there is avoided a zone of excessive heat in the kiln that may cause the particulate solids to become tacky.

A mixture consisting of 25% nitrogen and 75% hydrogen by volume, is generated in an ammonia dissociator 69, and passed along with the hydrogen formed in dissolving the scrap in tank 91 into the discharge end of the kiln 10 through a pipe line 70. In passing slowly through the kiln, the iron and manganese sulfates are by the hydrogen progressively reduced at temperatures between 1000° and 1450° F., in accordance with the following endothermic reaction:

(Reaction II)

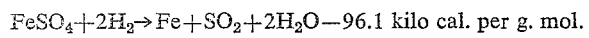
$$FeSO_4 + 2H_2 \rightarrow Fe + SO_2 + 2H_2O - 96.1 \text{ kilo cal. per g. mol.}$$

The finely divided, reduced metallic product is discharged from the kiln into the hopper 37 at a temperature between 1000° and 1400° F. Such product is in the form of a powder, which is cooled somewhat by the hydrogen and nitrogen introduced at the discharge end of the kiln, but to avoid any oxidation of the product, it preferably is further cooled to about 200° F. before it is exposed to air. This further temperature reduction is accomplished in the chamber 38, which is cooled with water sprays 39 as the ram 40 pushes the powder through the chamber, and upon the screen 89 whereupon the powder is ready to be loaded into tarred shipping containers 42.

The volatile products of the reduction consist of sulphur dioxide and water vapor mixed with nitrogen introduced with the hydrogen. To recover the sulphur dioxide, these products, which carry a trace of dust and are at a temperature near 1000° F. are passed through apparatus 17 by connecting the outlet pipe 34 to the inlet 16 and starting the fan 49. Upon entering the inlet 16 of such apparatus the hot gases and vapors pass through a filter 50 of fibre glass to remove dust.

In normal operations this filter may not be necessary and may be removed through a slot 51. The gases then enter at low velocity a tubular cooler 52 and are indirectly cooled to a temperature of from 150° to 190° F. by means of water introduced through a pipe 53. The flow of water is downwardly through the cooler to an outlet 54, and the flow is regulated to cool the gases and vapors to the said temperature, which must be maintained, as the by-products, ammonium bisulfite or acid ammonium sulfite, to be recovered decompose at temperatures above 200° F. Also, it is desirable to condense some of the water vapor. As the gases and vapors leave the cooler through duct 55, sufficient anhydrous ammonia is introduced through a pipe 56 to react with the water vapor and the $SO_2$ in the gaseous mixture, to form ammonium acid sulfite in accordance with the following reaction:

(Reaction III)

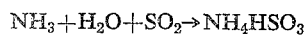
$$NH_3 + H_2O + SO_2 \rightarrow NH_4HSO_3$$

As $H_2SO_3$ is a stronger acid than $H_2CO_3$, and as the temperature is above the decomposition temperature of either ammonium carbonate or ammonium bicarbonate, neither of these products is formed.

The gases, with ammonium acid sulfite in suspension, are next drawn through a tube 57 in an absorber, or saturator vessel, 58. This vessel is kept filled with a body of water 59 at 140° F. to 160° F. up to a level with the center line of the tube 57, which tube is sixteen to twenty inches in diameter and contains a large number of perforations in its lowest quadrant. The gases, under the effect of fan 49, are caused to escape from the perforations in tube 57 and to bubble upwards through the water, which dissolves the acid ammonium sulfite and any uncombined $SO_2$, leaving nitrogen mixed with a little hydrogen. Since the gases are cooled to about 160° F. they leave the saturator containing approximately 30% by volume of water vapor, which is about equal to the water condensed in the saturator.

The agitation effected by the bubbling gases causes this solution in the upper portion of the body 59 to mix gradually with the solution below, which is kept ammoniacal by an equal volume of anhydrous ammonia introduced into the bottom of the vessel through tube 60, connected to a tank 61 of compressed ammonia gas. The ammonium bisulfite reacts with the ammoniacal water to form neutral ammonium sulfite in accordance with the following reaction:

(Reaction IV)

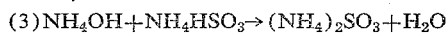

$$(3)NH_4OH+NH_4HSO_3 \rightarrow (NH_4)_2SO_3+H_2O$$

Since ammonium acid sulfite ($NH_4HSO_3$) is extremely soluble in water at 140° F. to 160° F. (620 g. dissolves in 100 g. of water at 140° F.) and neutral ammonium sulfite is less than one-tenth as soluble (52 g. dissolves in 100 g. of water at 140° F.) the neutral ammonium sulfite in the saturated solution forms crystals that slowly settle into the restricted bottom 62 of the saturator. At intervals this salt is drawn off through a tube 63 into a centrifuge 64, where the crystals are separated from the mother liquor which flows through a tube 65 and a filter 90 into a tank 66, from which it is pumped through a pipe 67 back into the saturator just above the top of the body of liquid 59. To prevent caking, the centrifuged salt is passed through a rotary drier (not shown, but conventional in form), and therein the salt is dried with air at a temperature of about 300° F.

Since considerable ammonium sulfite may be marketed as a 30% solution, a portion of the mother liquor may be diverted to a suitable container 68 and diluted by adding water equal to approximately 75% of the volume of the mother liquor.

To produce ammonium sulfite in the form of a finely divided anhydrous powder I process the gases and vapors developed in the interior of kiln 10 in an alternate apparatus. That is to say, I connect the outlet pipe 34 to the inlet pipe 71, and start fan 75. The gases and vapor from the kiln 10, consisting of $N_2$, $H_2$, $SO_2$, and $H_2O$, are drawn through cooler 72, to reduce their temperature to about 140° F. and anhydrous ammonia at about 40° F. is introduced through pipe 73, when the following endothermic reactions occur:

(Reaction V)

$$SO_2+H_2O \rightarrow H_2SO_3$$

(Reaction VI)

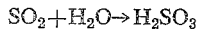

$$H_2SO_3+2NH_3 \rightarrow (NH_4)_2SO_3$$

The anhydrous ammonium sulfite thus formed is carried by the nitrogen and hydrogen into a large separator tank 74, where the salt settles slowly to the hopper-shaped bottom of the tank. The size of this tank varies with the maximum volume of gas to be cleaned, and is adjusted so the upward rate of flow of gas is less than the settling rate of the ammonium sulfite, which in turn varies from one-half foot to two feet per minute, according to the particle size.

As already mentioned in the introduction to this specification, the invention is applicable to the production of powdered iron from other salts of iron than ferrous sulphate. For example, in processing ferrous chloride, I preheat it in kiln 1 to a temperature near 500° F. to dehydrate it completely, aiming to have it at a temperature between 500 to 600° F. as it enters kiln 10. At higher temperatures, the salt ($FeCl_2$) tends to form ferric chloride and an oxide of iron. In kiln 10 the salt flows slowly counter current to an atmosphere of hydrogen, or hydrogen and nitrogen, heated to between 1000 and 1300° F. and is gradually reduced to iron powder with the formation of the hydrochloric acid gas in accordance with the following endothermic reactions:

(Reaction VII)

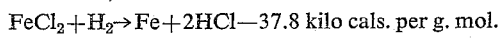

$$FeCl_2+H_2 \rightarrow Fe+2HCl - 37.8 \text{ kilo cals. per g. mol.}$$

Control of the temperature of the nitrogen-hydrogen gas is important, the object being to heat the salt rapidly to a temperature between 1125 and 1240° F. for the following reasons:

(1) Reduction begins at about 1050° F., but the iron powder produced up to 1120° F. is pyrophoric and in the form of impalpable powder.

(2) Anhydrous ferrous chloride, $FeCl_2$, melts at 1246° F., reduction is retarded, occurs at the surface of the melt and forms a sponge iron instead of a powder.

(3) Ferrous chloride reduced at 1225° F. forms a powder which is not pyrophoric.

The delivery end of the kiln must be kept at such a temperature that the iron powder will be heated to between 1450° F. and 1500° F. as it leaves the kiln in order to drive off all the chlorine and avoid rings forming, as they do when the powder is heated to above 1500° F. and the powder tends to become sticky or tacky.

The dry hydrochloric acid gas produced by Reaction VII is conducted through outlet pipe 34 to the scrap dissolving tank of Fig. 7, into which it is introduced at the liquid level through perforated rubber-coated pipes 102. The gas is extremely soluble in water and reacts rapidly with the scrap thus:

(Reaction VIII)

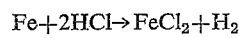

$$Fe+2HCl \rightarrow FeCl_2+H_2$$

The process, therefore, is a cyclic one in which the acid and the hydrogen are reused continuously for the production of powdered iron from scrap.

A present source of iron salts for conversion into powdered iron is found in the pickle liquor of steel plants, pickle liquor being the liquid residue of the sulphuric or hydrochloric acid used in pickling steel sheets, strip, or other steel products. Indeed, steel plants today are faced with the serious and costly problem of disposing of pickle liquor without pollution of streams and rivers, or without otherwise endangering public well being. In accordance with the objects of my invention, a solution of this problem is realized, together with outstanding gains in the public economy.

Spent pickle liquor, as discarded from the pickling tanks of steel mills, is not entirely neutralized, but contains varying degrees of active acid. In taking the spent pickle liquor from the steel mills, I first neutralize it by letting it react with iron or steel scrap, whereby it can be handled in steel pipes, tank cars, trucks, barges or other conveyances, without danger of such facilities being attacked by any residual acid in the pickle liquor. On the other hand the conveyances may be lined with lead or rubber, and the spent pickling acid or pickle liquor may be neutralized by means of scrap placed in the conveyances (say in the tank cars or barges), so that the liquor may be neutralized while it is in the course of transit to the plant in which powdered iron is to be produced.

Raw pickle liquor varies in composition, containing from 15% to 18% ferrous sulphate, about 0.1% manganese sulphate, from 2% to 7% free sulphuric acid, and from 0.01% to 0.02% other impurities. Neutralized pickle liquor is an aqueous solution that contains about 21 ferrous sulphate, and 0.1% manganese sulphate. The solubilities of ferrous sulphate at 120° F. is 21.75 g. in 100 g. of water, while 64 g. of manganese sulphate is soluble in 100 g. of water at such temperatures. When the pickle liquor arrives at the powdered iron plant, the ferrous sulphate is recovered from the liquor, and iron powder is produced in accordance with the procedures described in the foregoing specification. In the case of hydrochloric acid pickling solutions the procedure is essentially the same.

In the production of pure powdered iron, I first produce pure ferrous sulphate by selective crystallization, that is, by evaporating the water of the starting solution of my process just short of the point where manganese sulphate begins to crystallize and to separate with the ferrous sulphate. The ferrous sulphate crystals are separated by settling or centrifuging, and the mother liquor containing the manganese sulphate and other impurities is discarded. To effect this separation, I use a multiple effect evaporator 76 (Fig. 5), and equip this evaporator with a preheater 77, in which the neutralized ferrous sulfate solution is first preheated to between 200° F. and 210° F. and then allowed to flow through tube 78 into a first stage 79 of the evaporator. Under partial vacuum steam is formed, which is passed through a pipe 85 into a second stage 80 and condensed with water in a jet condenser 81 to maintain the vacuum. The liquor passes through a tube 86 into a second stage 80, in which ferrous sulphate crystals form, and settle into a centrifuge 87 for removal of excess liquid. The recovered liquid is pumped back into the second evaporator stage 80 via a pipe 88. The pure ferrous sulphate crystals may be further dried under the effect of heat, if desired. The heat for the preheater 77, is supplied by connecting an inlet 82 with the outlet duct 29 of kiln 10, Fig. 1. The preheater is constructed similar to a fire tube boiler, and the hot products of combustion from the kiln 10 enter the preheater at about 1600° F. and escape through a stack 83 at a temperature between 550° F. and 750° F. to supply draft sufficient to discharge the products of combustions of my method. For example, ferrous sulfate may be supplemented by gas introduced through a burner 84.

The pure ferrous sulfate thus obtained is processed by the method described in the foregoing context for the production of pure powdered iron and ammonium sulfite.

Ferric sulfate, $Fe_2(SO_4)_3$, and $Fe_2(SO_4)_3 \cdot 9H_2O$, is processed in the same way as ferrous sulfate, the proportions by weight being given by the following reaction:

(Reaction IX)

$$Fe_2(SO_4)_3 + 6H_2 \rightarrow 2Fe + 3SO_2 + 6H_2O$$

The apparatus provided permits not only the use of ferrous or ferric sulfate or chloride for the production of powdered iron, but also provides for various modifications of my method. Fo example, ferrous sulfate may be mixed with powdered charcoal or other form of pure carbon and passed through kiln 1 at a temperature of about 1500° F. to effect the following endothermic reaction:

(Reaction X)

$$3FeSO_4 + 2C \rightarrow Fe_3O_4 + 3SO_2 + 2CO$$

The products of combustion are passed through apparatus 17 for the recovery of sulfur dioxide ($SO_2$) as described herein, while the ferrous oxide ($Fe_3O_4$) is delivered to kiln 10 where it is exposed to hydrogen at 1400° F.–1450° F. and reduced to powdered iron in accordance with the following endothermic reaction:

(Reaction XI)

$$Fe_3O_4 + 4H_2 \rightarrow 3Fe + 4H_2O$$

By another modification, I mix powdered charcoal with the ferrous sulfate, preheat the mixture to between 800° F. and 900° F. in kiln 1 to dehydrate the salt, and effect the reduction in kiln 10 heated to about 1450° F. in a counter-current flowing atmosphere of methane and hydrogen. Under these conditions the reaction that occurs may be represented as follows:

(Reaction XII)

$$3FeSO_4 + C + CH_4 + 3H_2 \rightarrow 3Fe + 3SO_2 + 2CO + 4H_2O$$

Having thus described the invention, including certain permissible modifications and variations, I desire to point out that other modifications may be practiced in both my method and apparatus, without exceeding the scope of the invention, as defined by the following claims.

I claim:

1. The method which comprises subjecting a finely divided iron sulphate to the action of hydrogen at a temperature in the range of from 1050° F. to 1500° F. and thereby producing iron powder while releasing gaseous oxides of sulphur and of hydrogen, cooling said oxides and subjecting them to gaseous ammonia while below the decomposition temperature of ammonium sulfite and thereby producing ammonium sulfite.

2. The method of disposing of sulphuric pickle liquor that comprises iron sulphate and other salts and impurities in solution, said method comprising the steps of evaporating the excess water from the solution and forming iron sulphate crystals, heating and agitating the crystals to drive off the water of crystallization and provide iron sulphate in finely divided form, exposing the latter iron sulphate at an elevated chemical-reaction temperature to the action of hydrogen and thereby producing iron powder, with an accompanying release of sulphur dioxide and water vapor, separating the iron powder from such oxide of sulphur oxide and water vapor and cooling the powder for packaging to a temperature below that at which it is oxidized by air, cooling the sulphur dioxide and water vapor and subjecting them to gaseous ammonia at a temperature below the decomposition temperature of ammonium sulphite and thereby producing neutral ammonium sulfite.

3. The method which comprises advancing iron sulphate in loose finely divided form through a hydrogenous reducing atmosphere in a heated retort and thereby producing iron powder while releasing gaseous oxides of sulphur and hydrogen, delivering such iron powder from the heated retort into a receptacle containing a non-oxidizing atmosphere, cooling the receptacle and contained iron, while maintaining the iron in powdered form, to a temperature below that at which such iron is pyrophoric in the open air, and recovering and cooling the said gaseous oxides and subjecting them to reaction with ammonia.

4. The method which comprises recovering iron sulphate of high purity from pickle liquor by selective crystallization, dehydrating the sulphate crystals and converting them into loose, finely divided form, advancing the sulphate in such form through a hydrogenous reducing atmosphere in a heated retort and thereby producing iron powder while releasing gaseous oxides of sulphur and hydrogen, delivering such iron powder from the heated retort into a receptacle containing a non-oxidizing atmosphere, cooling the receptacle and contained iron, while maintaining the iron in powdered form, to a temperature below that at which such iron is pyrophoric in the open air, and recovering and cooling the said gaseous oxides and subjecting them to reaction with ammonia.

5. The method which comprises passing a sulphuric pickle liquor through a multiple-effect evaporator and separating from said liquor relatively pure iron sulphate in crystalline form, driving off the water of crystallization and transforming the sulphate into an anhydrous, finely divided condition, advancing the sulphate in such condition through a hydrogenous reducing atmosphere in a heated retort and thereby producing iron powder, while releasing gaseous oxides of sulphur and hydrogen, delivering the iron powder from said heated retort and cooling the iron powder in a non-oxidizing atmosphere to a temperature below that at which such iron powder is pyrophoric in the open air, and recovering and cooling the said gaseous oxides and subjecting them to reaction with ammonia.

References Cited in the file of this patent

UNITED STATES PATENTS

| | | |
|---|---|---|
| 1,574,382 | Farup | Feb. 23, 1926 |
| 2,065,618 | Sherwood | Dec. 29, 1936 |
| 2,663,633 | Crowley et al. | Dec. 22, 1953 |

OTHER REFERENCES

Annales des Mines, 9. Serie, Memoires, Tome 18, page 118. Published in 1900.

Transactions of the American Electrochemical Society, vol. LI, page 483.

Comprehensive Treatise on Inorganic and Theoretical Chemistry, vol. 14, pages 247 and 264. Edited by Mellor. Published in 1935 by Longmans, Green and Co., New York, N. Y.

U. S. DEPARTMENT OF COMMERCE
PATENT OFFICE

CERTIFICATE OF CORRECTION

Patent No. 2,818,328                              December 31, 1957

Charles B. Francis

It is hereby certified that error appears in the printed specification of the above numbered patent requiring correction and that the said Letters Patent should read as corrected below.

Column 6, line 75, for "21 ferrous sulphate" read -- 21% ferrous sulphate --; column 7, line 40, strike out "tions of my method. For example, ferrous sulfate may be" and insert instead -- tion to the air. If and when necessary this heat may be --; line 55, for "Fo example" read -- For example --.

Signed and sealed this 25th day of March 1958.

(SEAL)
Attest:

KARL H. AXLINE                                              ROBERT C. WATSON
Attesting Officer                                         Commissioner of Patents